W. A. HOLLINGSWORTH.
THRESHING MACHINE.
APPLICATION FILED SEPT. 3, 1909.
953,833.
Patented Apr. 5, 1910.
2 SHEETS—SHEET 2.
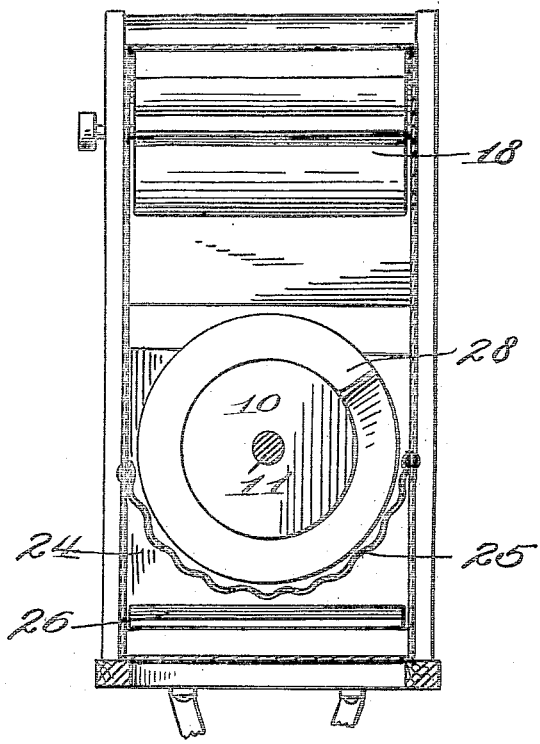
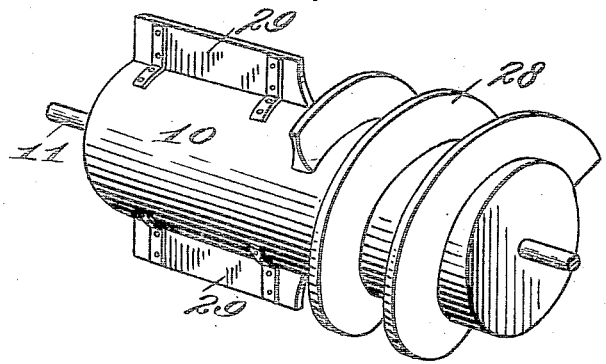
Witnesses
A. R. Walton.
F. A. Barron.
Inventor
Willis A. Hollingsworth
By Milo B. Stevens & Co.
Attys

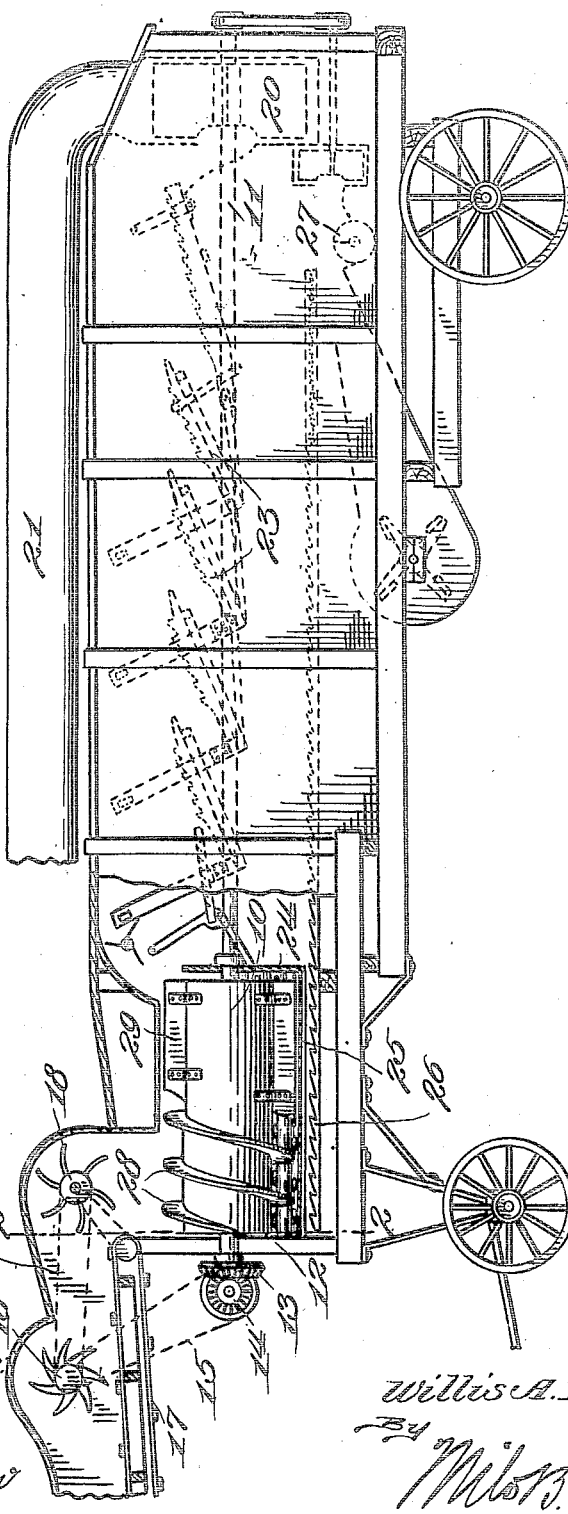

UNITED STATES PATENT OFFICE.

WILLIS A. HOLLINGSWORTH, OF ENID, OKLAHOMA, ASSIGNOR OF ONE-HALF TO BRUCE L. COSNER, OF ENID, OKLAHOMA.

THRESHING-MACHINE.

953,833.  Specification of Letters Patent.  Patented Apr. 5, 1910.

Application filed September 3, 1909. Serial No. 516,092.

*To all whom it may concern:*

Be it known that I, WILLIS A. HOLLINGSWORTH, a citizen of the United States, residing at Enid, in the county of Garfield and State of Oklahoma, have invented certain new and useful Improvements in Threshing-Machines, of which the following is a specification.

My invention relates to threshing machines of that type commonly known as cylinder machines, and my object is to provide a machine employing a minimum amount of gearing with a consequent reduction of friction.

A further object of my invention is to provide a threshing cylinder, novel as to its construction, arrangement and operation.

Further objects, and the advantages, of my invention will be apparent from the following description, in which reference is made to the accompanying drawings, illustrating my improved construction, and forming a part of this specification, and in which, Figure 1 is a side view, partly in section, of a threshing machine, embodying my improvements. Fig. 2 is a transverse section therethrough on line 2—2 of Fig. 1, and, Fig. 3 is a perspective view of the cylinder removed, its shaft being broken away.

Referring to these drawings, I provide a threshing cylinder 10, which, as shown in Fig. 1, is mounted longitudinally of the machine, adjacent its rear end, whereas the ordinary cylinders are mounted transversely. The cylinder 10 is secured upon a shaft 11 extending longitudinally through the entire length of the machine, which shaft projects, at its rear end, through the rear wall 12, and is provided with a bevel gear 13, with which meshes a similar gear 14 driven by a belt 15 from the band cutter 16 above the feed elevator 17. At the front end of the elevator 17, from whence the material drops to the cylinder 10, there is mounted a feed wheel 18, driven by a belt 19 from the band cutter, which operates to prevent the crowding of the material upon the cylinder 10 and to maintain the feed thereto uniform. Upon the forward end of the shaft 11, at the extreme forward end of the machine, is secured the straw-stacking fan 20, communicating with the straw chute 21 and adapted to receive the straw from the straw racks 23, upon which the straw is delivered, by the cylinder 10, over the rear wall 24 of the concave 25 surrounding said cylinder as usual, said concave being corrugated and provided with perforations through which the grain drops upon the grain pan 26, delivering to the transverse grain auger 27 at its forward end as is usual. By the particular arrangement of the cylinder 10 upon a shaft which extends longitudinally through the entire length of the machine, however, the usual belts extending longitudinally of the machine are done away with and better transmission of power, with reduction of the danger of breakage, obtained. Owing to this arrangement of cylinder 10, however, it is of necessity of different structure from the ordinary cylinders which extend transversely. This cylinder has, upon its receiving end, a spiral conveying screw 28 which forces the material rearwardly to the longitudinal blades 29 upon its rear end, the centrifugal force of the cylinder causing the material to be thrown outwardly against the concave 15. This action assists the blades 29 to separate the grain between themselves and concave 25, the grain being disposed of in the ordinary manner as heretofore set forth.

I claim:

In a threshing machine of the character described, the combination of a longitudinal shaft journaled through the ends thereof, a concave therein around the forward portion of said shaft, a solid threshing cylinder of uniform diameter throughout its length mounted upon said shaft and located wholly within said concave, said cylinder being provided with a continuous spiral feeding vane or flange at its forward or feed end, and with straight and separate, spaced, longitudinal threshing blades extending forwardly from its rear end and secured along its periphery parallel with its axis separate from said feeding vane, the rear end of said feeding vane and the forward ends of said threshing blades, terminating substantially centrally of said cylinder.

In testimony whereof I affix my signature, in presence of two witnesses.

WILLIS A. HOLLINGSWORTH.

Witnesses:
MARK B. CLARK,
WILLIAM H. SQUIER.